A. A. DE MARS.
HUB FOR AUTOMOBILE WHEELS.
APPLICATION FILED AUG. 25, 1906.
916,118.
Patented Mar. 23, 1909.
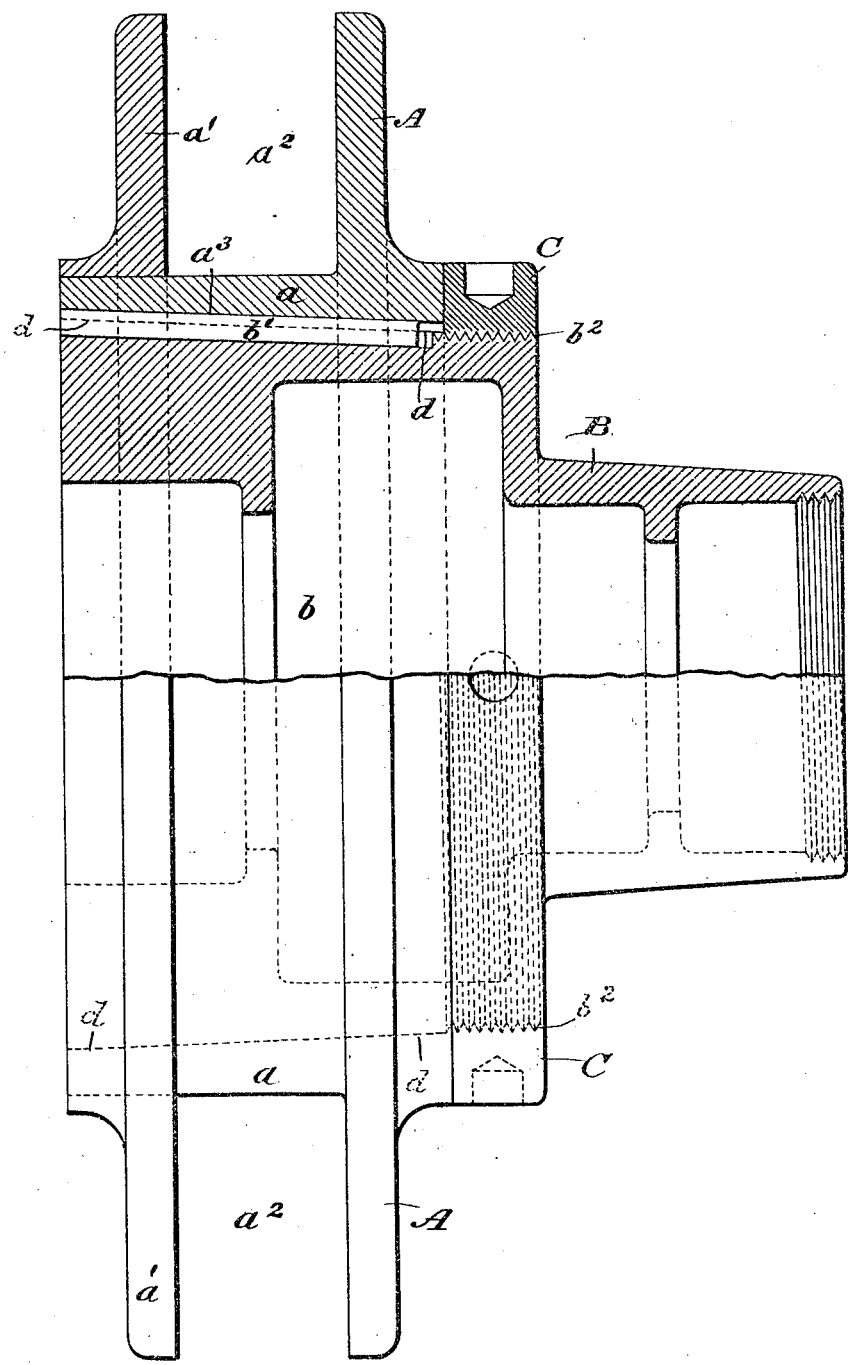
WITNESSES:
INVENTOR:
Alfred A. De Mars
by attorney
J. B. Fay

UNITED STATES PATENT OFFICE.

ALFRED A. DE MARS, OF LAKEWOOD, OHIO, ASSIGNOR OF ONE-HALF TO HARRY COULBY, OF LAKEWOOD, OHIO.

HUB FOR AUTOMOBILE-WHEELS.

No. 916,118.   Specification of Letters Patent.   Patented March 23, 1909.

Application filed August 25, 1906. Serial No. 331,963.

*To all whom it may concern:*

Be it known that I, ALFRED A. DE MARS, a citizen of the United States, resident of Lakewood, county of Cuyahoga, and State of Ohio, have invented a new and useful Improvement in Hubs for Automobile-Wheels, of which the following is a specification, the principle of the invention being herein explained and the best mode in which I have contemplated applying that principle, so as to distinguish it from other inventions.

My invention relates to automobile wheels and particularly to the hubs thereof and has for its object the provision of a hub of such construction that, when it is necessary to remove or replace an automobile tire, the same may be done much more easily and quickly than is possible with present wheel-constructions with which I am acquainted, by removing or replacing the greater part of the wheel, including a portion of the hub.

Said invention consists of means hereinafter fully described and specifically set forth in the claim.

The annexed drawing and the following description set forth in detail certain mechanism embodying the invention, such disclosed means constituting but one of various mechanical forms in which the principle of the invention may be used.

In said annexed drawing: the figure represents a partial axial section and a partial elevation of my improved wheel-hub.

In the construction illustrated and showing one way of carrying out the spirit of my invention, the hub comprises essentially an outer member A and an inner member B. Said outer member A comprises the main portion $a$ and the inner clamping ring $a'$ forming between them the groove $a^2$ adapted to receive and retain the spoke-tenons (not shown). Said portion $a$ is formed with the inner groove $a^3$. The inner member B is formed with the aperture $b$ designed for the reception of the axle-box and is provided with a spline $b'$ adapted to be received by the groove $a^3$ to non-rotatably secure together the members A and B. The outer surface of the member B is provided with a thread $b^2$ adapted to receive an internally-threaded ring or nut C by means of which the members A and B are retained rigid relatively to each other. It will be noted by reference to $d\ d$ of the drawing that the members A and B are provided with complementary tapering surfaces, the member A having such an inner surface and the member B such an outer surface.

The use of my improved hub is as follows: When it is desired to remove or replace a tire, the same is not removed from the wheel-rim, but the ring C is unscrewed from the thread $b^2$ and the outer member A of the hub driven off the inner member B, the rim, spokes, tire, felly and connected parts of the wheel being thus all removed together, the tapering surfaces $d\ d$ rendering such removal an easy operation. Another wheel, an extra one or more of which it is proposed that an automobilist should carry in lieu of the tire alone, can then be driven over the member B and the ring C replaced. Such operation, it will be readily apparent, is much more easily and quickly accomplished than would be the removal of a tire from the wheel-rim and the replacement of the same by another tire.

The use of my invention will be most convenient, of course, when the automobilist is upon the road, and, consequently, upon such an occasion more than any other desires to quickly replace a damaged tire. The latter can be removed from the rim and repaired or replaced by another when the automobilist returns to the garage or any other place and at such a time as is most convenient for him.

Having thus described my invention in detail, that which I particularly point out and distinctly claim is:

A hub for automobile wheels, comprising an inner member having a tapering outer surface, and screw threaded at one end, and adapted to receive an axle-box, an outer member having its inner surface tapered in a direction complementary to that of the taper of the inner member, and provided with an annular flange, a spline fitting a groove formed between the meeting tapered surfaces of said inner and outer members, a clamping ring fitted upon said outer member, and an internally threaded ring fitting upon the threaded end of said inner member, and bearing against the adjacent end of said outer member.

Signed by me, this 22" day of August 1906.

ALFRED A. DE MARS.

Attested by—
  JNO. F. OBERLIN,
  G. W. SAYWELL.